3,329,639
SURFACE CONDITIONER AND SEALER
Robert L. Hawkins, Jr., North Olmsted, Ohio (9808 Meech Ave., Cleveland, Ohio 44105), and William M. Tomc, 2504 Lee Road, Cleveland Heights, Ohio 44118
No Drawing. Filed June 3, 1964, Ser. No. 372,386
4 Claims. (Cl. 260—29.6)

This invention relates to a one-package composition for use on monolithic concrete, concrete blocks, cinder blocks, artificial stone, brickwork and masonry structures generally, more particularly a coating composition with scavenging, neutralizing, etching, pore-filling, sealing, protective and bonding properties.

In the past, it has been common practice to clean the exposed surfaces of masonry, usually fresh masonry, by applying to them a 2:1 water solution of an inorganic acid such as 35% muriatic acid: this, although not ordinarily described in such terms, is in fact an instance of the application of a single-package composition to a masonry structure. If nothing else is required than brushing, acid-cleaning and perhaps washing, the entire treating process may be complete without more. However, in many cases, brushing, acid-cleaning and washing are but the first steps in a considerably more elaborate multi-package operation that may include two, three or more of these preparatory steps and as many as three or more subsequently performed steps collectively directed to the sequential deposition of protective and/or adhesive and/or decorative coatings.

From such practices and compositions as those referred to above the present invention differs, inter alia, in that it contemplates the application to a typical masonry substrate of a water-based emulsion of solids content between about 10% and about 60% by weight which can be supplied, purchased and used in single-package form; which is at one and the same time possessed of neutralizing, scavenging, cleaning and etching properties; which by filling or at least tending to fill the exposed pores in the masonry substrate serves to achieve an appreciable amount of surface leveling; and which, in relation to subsequently applied coating compositions and systems of coating compositions, functions to uncommonly good advantage as a combined primer, base and bonding medium. Unlike many masonry sealers, paints and finishes of kinds heretofore known, the coating composition of the present invention is decidedly acidic in nature, being characterized, as a result of the deliberate introduction of an aggresive acid, by a pH well below 5.

Other features, advantages and objects of the invention will be set forth in the description which follows and in the accompanying claims.

The invention can perhaps be described to best advantage by first outlining briefly what may be taken to be the more important of the steps conventionally employed in the preparation of aqueous emulsions of polymers of the vinylidene family, broadly speaking; viz;

(a) As a rule, the polymerization recipe calls for ⅓ to ⅔ parts by weight of water per part of reactive monomer or monomers.
(b) The water is preliminarily boiled and sparged with an inert gas ($N_2$ or $CO_2$) to eliminate dissolved oxygen insofar as possible.
(c) To the water is added 2 to 12% (more often 4 to 8%) of a conventional non-foaming anionic surfactant.
(d) Part of the monomer, more commonly a mixture of varying proportions of two or three monomers, is added to the solution.
(e) A catalyst of the free-radical type is added with or without a complementary reducing agent.
(f) The temperature is increased to initiate reaction and thus give a dilute suspension of polymer particles swollen with monomer (the seed).
(g) To the seed, the remaining monomer is added in increments over a period of time.
(h) Additional amounts of catalyst are ordinarily added from time to time to promote the speed of reaction.
(i) When the addition of monomer has been accomplished, the temperature commonly is increased, the mixture being held at the elevated temperature until the reaction is substantially complete.
(j) At this time, it is usual to add a conventional non-ionic emulsifier.
(k) The monomer fraction which remains unreacted at this stage is usually removed by applying a vacuum, steam-distilling, or sparging with inert gas.
(l) Water is added, if needed, in order to preserve suspension stability (as a general rule, the emulsion must contain 40% or more of water).
(m) Stability in the presence of subsequently added acidic ingredients can best be assured by adding at this time large quantities of a conventional non-ionic emulsifier and/or a suitable buffering agent (in the latter case, the buffering agent may consist in part of one or more cationic emulsifiers, preferably of the amine or quaternary nitrogen type).
(n) If, as in the present invention, an aggresive acid is to be introduced, it is added only after the emulsion has been rendered stable in respect both of such addition and of its effect in reducing the pH value of the batch.

With the foregoing explanation in mind, the following may be taken to be representative examples of aqueous emulsions of polymers of the vinylidene family to which an aggressive acid, organic or inorganic, may be added as hereinafter described to produce one-package coating compositions of kinds within the purview of the present invention:

(1) An emulsion containing about 350 g. of water and about 30 g. each of a low-foaming anionic detergent such as an alkyl aryl sulphonate and a non-ionic detergent such as an alkyl-substituted phenoxy ether of a polyethoxy ethanol, together with about 250 g. of the copolymer derived from 100 g. of ethyl acrylate, 100 g. of methyl methacrylate, and 50 g. of dimethylaminoethyl methacrylate (1 to 10 g. of the acrylic ester may be replaced by glacial acrylic acid).

(2) An emulsion containing about 100 g. of copolymer per 150 g. of water where the copolymer is derived from a mixture of equal parts of vinyl acetate and butyl acrylate monomers or equal parts of vinyl acetate, vinyl benzoate and butyl acrylate monomers (up to 20% of the monomer charge may be replaced by 10 to 15% of acrylic, methacrylic, crotonic, fumaric, maleic or itaconic acid).

(3) An emulsion containing 100 to 150 g. of copolymer per 150 g. of water and emulsifiers, anionic, cationic and non-ionic, such copolymer being made from 50 to 85% of vinyl chloride and 15 to 50% of vinylidine chloride (all or part of the vinylidene chloride up to a maximum of about 25% may be replaced, if desired, by acrylonitrile, acrylamide, acrylic acid or a mixture of the three).

(4) An emulsion containing, per 150 g. of water, 100 to 175 g. of the copolymer produced by polymerizing equal parts of styrene, ethyl acrylate and methyl methacrylate in the presence of a mixture of anionic, cationic and non-ionic emulsifiers, the total quantity of the latter not exceeding 35 grams (up to 15% of the styrene may be replaced by half-esters of such acids as maleic, fumaric and itaconic acids, by acrylamide or acrylonitrile, or by a mixture of the two).

(5) An emulsion containing 100 to 150 parts of copolymer per 150 g. of water, such copolymer being obtained by emulsion copolymerization of 20 to 40% butadiene and 60 to 80% of styrene or vinyl toluene (up to 10% of the styrene may be replaced by acrylonitrile or by maleic, fumaric, itaconic, crotonic or sorbic acid).

In general, a variety of homopolymers and copolymers can be used in making emulsions such as the foregoing. The composition of the polymer and the order of its addition to the mixture determines the minimum film-forming temperature. This is the minimum temperature at which the latex particles in a layer not exceeding 10 mils thickness as originally applied will fuse into a coherent film after most of the water has been evaporated. Those polymers which have a minimum film-forming temperature above 5° C. but not above 18° C. are considered to be most useful for the purposes of the present invention.

Examples of emulsifying agents that may be used where non-ionic emulsifying agents are called for in (1) to (5), above, include alkylphenoxy polyethoxy ethanols having alkyl groups with seven to twenty carbon atoms and six to sixty oxyethylene units, such, for example, as heptylphenoxy polyethoxy ethanols, octylphenoxy polyethoxy ethanols, methyloctylphenoxy polyethoxy ethanols, nonylphenoxy polyethoxy ethanols, dodecylphenoxy polyethoxy ethanols and the like; polyethoxy ethanol derivatives of methylene-linked alkyl phenols; ethylene oxide derivatives of long-chain carboxylic acids such as lauric, myristic, palmitic, oleic and the like; analogous ethylene oxide condensates of octyl, decyl, lauryl, cetyl and other long-chained alcohols; and ethylene oxide derivatives of sorbitan monostearate and other esterified polyhydroxy compounds with hydrocarbon chains containing six to sixty oxyethylene groups.

Representative anionic emulsifying agents include sodium lauryl sulfate; sodium isopropyl benzene sulfonate; sodium isopropyl naphthalene sulfonate; sodium octyl sulfosuccinate; and alkali metal salts of alkylaryl polyethoxy ethanol sulfates. Typical cationic emulsifying agents include lauryl ammonium acetate; lauryl pyridinium chloride; cetyl dimethyl amine acetate; t-octylphenoxyethoxyethoxy dimethyl benzyl ammonium chloride; and alkyl dimethyl benzyl ammonium chlorides in which the alkyl group has from eight to eighteen carbon atoms (octyl, decyl, dodecyl, octadecyl, etc.).

Emulsions of the above-described types, all of which are more or less acidic in the final stage, are or can be rendered compatible with acetic, oxalic and other aggressive organic acids and with phosphoric, sulphuric, hydrochloric and like inorganic acids. Thus an acid selected from, or functionally similar to, those named may be added to the emulsion, usually in an amount between about ¼% and about 20% based on the total weight of the final mixture, as may also a fugitive dyestuff of suitable type. So far as known, it has not occurred to others to take advantage of this unique situation to put together a combination of ingredients which has, among others, the properties required for cleaning, scavenging, neutralizing, etching and controlling porosity in a substrate as variable as new concrete.

The compounding of one-package coating compositions consisting largely or entirely of (a) emulsions of the nature of (1) to (5), above; (b) emulsifying agents such as those set forth in prior paragraphs; and (c) one or more aggressive organic or inorganic acids presents no unusual problem to those skilled in the art so long as adequate attention is paid to the need for mutual compatibility at the stages at which the various ingredients are added to the batch. One-package coating compositions so prepared may be used for the purposes of the present invention after the introduction of a fugitive dyestuff of the nature of an alkali-responsive acid-tolerant indicator and, if desired, of other substances as well. The dyestuff is usually the last ingredient to be added and is introduced in very small amount, just enough to noticeably color the mass.

The preferred dyestuff is Methyl Orange, which in a medium with a pH value below about 5 is pink in color. If it is incorporated in a suitably formulated coating composition, the progress of the treatment of masonry, particularly new concrete, can be followed visually by the color change from pink to yellow that tends to take place as the pH value of the composition rises toward and above 5. At pH values above 6 the composition becomes virtually colorless. Neutralization by alkalies in the masonry of the acid or acids in the coating composition changes both the acidity and color of the composition, thus making it possible to follow the reaction at least in its later stages and to give it further attention, as required, by the application of additional quantities of the composition to any spots that have not been adequately treated.

In order to disclose the invention in greater detail, the following description goes into the manner of making what for convenience may be termed Emulsion A. Referring to U.S. Patent 2,795,564 to Conn et al., granted June 11, 1957, the procedure set forth in Example 2 is followed up to and including the step of cooling the batch after adding the last increment of glacial acrylic acid (5 parts in 65 parts of water). At this stage, the mixture is stable both with respect to the introduction of additional acid and with respect to the effect of the latter in reducing the pH of the batch. Instead of treating with ammonia to raise the pH to 9.5, an aqueous solution of 85% phosphoric acid is added slowly with stirring until the amount of phosphoric acid (calculated as $H_3PO_4$) equals 4.5% of the total weight. With the addition of Methyl Orange as a pH indicator, Emulsion A may be used without more for the purposes and in the practice of the present invention.

Emulsion B, otherwise the same as Emulsion A, contains Methyl Yellow as an indicator instead of Methyl Orange.

Emulsion C, otherwise the same as Emulsion A, contains Methyl Red as an indicator.

Emulsion D, otherwise the same as Emulsion A, contains Alizarine Yellow R as an indicator.

Emulsion E, otherwise the same as Emulsion A, contains Heptamethoxy Red as an indicator.

Emulsion F, otherwise the same as Emulsion A, omits phosphoric acid in favor of a water solution of sulphuric acid, which is added slowly until the amount of sulphuric acid, calculated as $H_2SO_4$, equals 5% of the final weight of the batch.

Emulsion G, otherwise the same as Emulsion A, omits phosphoric acid in favor hydrochloric acid, which is added slowly in the form of a 36% solution in water until the amount of hydrochloric acid, calculated as HCl, equals 10% of the final weight of the batch.

Emulsion H is made by the procedure described in Example 10 of the Conn et al. patent. Instead of treating with ammonium hydroxide solution to raise the pH to 9.5, the addition of acetic acid is continued until the pH is reduced to about 3. After cooling, a pH indicator is added to the batch in a quantity just sufficient to color it uniformly. If Methyl Orange is used as a pH indicator, the mass will turn pink in color. When the product so obtained is applied to new concrete, the acetic acid content of the composition is neutralized by the alkalies in the concrete. As before, the color of the composition changes to yellow as the pH value approaches 5.

Illustrated by Emulsion I, described in this paragraph, a single-package coating composition within the purview of the present invention may be made by modifying one of the commercially available synthetic resin latices produced from common vinylidene monomers (the term "vinylidene" being used to refer collectively to monomers characterized by the bivalent vinylidene group $H_2C:C=$).

At the present time, synthetic resin latices of this kind are supplied, among others, by Jones & Dabney Co., a subsidiary of Devoe & Reynolds Co., Inc.; by E. I. du Pont de Nemours & Co., Inc.; and by the Chemicals Division of Union Carbide Corporation. Currently available from the latter is a synthetic resin latex of the following description:

Type—Vinyl-acrylic copolymer.
Total solids (by weight) _____percent__ 55
Viscosity of latex (Brookfield No. 2) ____cps__ 175-350
Specific gravity of latex _____ 1.08
Particle size (light-scattering) _____microns__ 0.17
pH of latex _____ 4.7

By reducing the pH of the mass to about 2 by the addition of an 85% aqueous solution of phosphoric acid and incorporating Methyl Orange as a pH indicator, a composition useful for the purposes of the present invention is produced.

Emulsion J is an indicator-containing emulsion derived from a commercial polyvinyl acetate latex supplied by Jones & Dabney Co. The following is a description of the latex:

Type—Vinyl acetate homopolymer.
Total solids (by weight) _____percent__ 57–60
Viscosity of latex (Krebs Units) _____ 75–95
Weight per gallon _____ 9.25 to 9.35
pH _____ 4.5 to 5

Any of several indicators may be added, among them Methyl Yellow, Methyl Red and Alizarine Yellow R.

Each of Emulsions A to J can be applied without further treatment of the emulsion to a surface such as a monolithic concrete slab. When the application is made, the acid constituents of the mixture react with any alkaline constituents that may be present in the masonry; at the same time, physical etching of the surface occurs. Almost simultaneously with this treatment, the polymer or mixture of polymers deposits on and partially or completely coats the surface, thereby filling capillaries and providing a basis for such protective and/or decorative coatings as are subsequently to be applied. If desired, the first of such subsequent coatings may be applied within a time as little as 30 minutes after the original treatment. In practice, this feature of the invention constitutes an important advantage.

It is intended that the patent shall cover, by summarization in appended claims, all features of patentable novelty residing in the invention.

What is claimed is:
1. A process for treating a masonry structure characterized by an appreciable degree of intrinsic alkalinity comprising the steps of (1) applying to a previously untreated surface a stable one-package etching, neutralizing, leveling, bonding and coating composition taking the physical form of an acidic aqueous emulsion of solids content between about 10% and about 60% by weight made up, in addition to water, of (a) a water-dispersed vinylidine polymer in finely divided form, (b) one or more acid-compatible surfactants, (c) an alkali-responsive acid-tolerant dyestuff, and (d) free acid in an amount between about ¼% and about 20% of the total weight of the composition; (2) reducing the free acid content of the composition by etching the structure by and reacting at least some of the intrinsic alkaline components thereof with free acid in the composition; and (3) precipitating the polymer in film form from the resulting acid-poor composition by evaporation of the greater part of the water content of the composition.

2. A process according to claim 1 wherein the dyestuff is a fugitive dyestuff.

3. A process according to claim 2 wherein the dyestuff is a pH indicator.

4. A composition for treating a masonry structure characterized by an appreciable degree of intrinsic alkalinity comprised of an acidic aqueous emulsion of solids content between about 10% and about 60% by weight made up, in addition to water, of (a) a water-dispersed vinylidene polymer in finely divided form, (b) one or more acid-compatible surfactants, (c) an alkali-responsive acid-tolerant dyestuff, and (d) free acid in an amount between about ¼% and about 20% of the total weight, the dyestuff being one selected from a group consisting of Methyl Red, Heptamethoxy Red, Methyl Orange, Methyl Yellow and Alizarin Yellow R.

References Cited

UNITED STATES PATENTS 2,973,285   2/1961   Berke et al. _____ 117—123
3,219,609   11/1965  Perronin _____ 260—29.6

OTHER REFERENCES

Lange, Handbook of Chemistry, Ninth ed., 1956, McGraw-Hill Book Co., Inc., N.Y., pp. 955–960.

SAMUEL H. BLECH, *Primary Examiner.*

MURRAY TILLMAN, *Examiner.*

J. ZIEGLER, *Assistant Examiner.*